Nov. 8, 1932.   C. BAILEY   1,887,394
LAWN MOWER SHARPENER
Filed Aug. 19, 1931
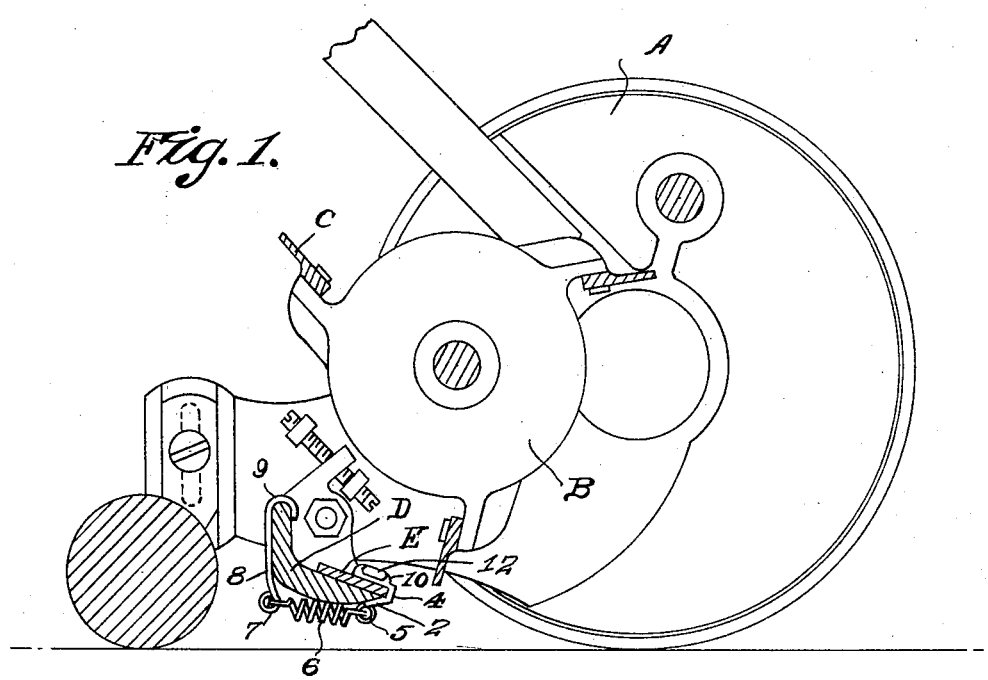
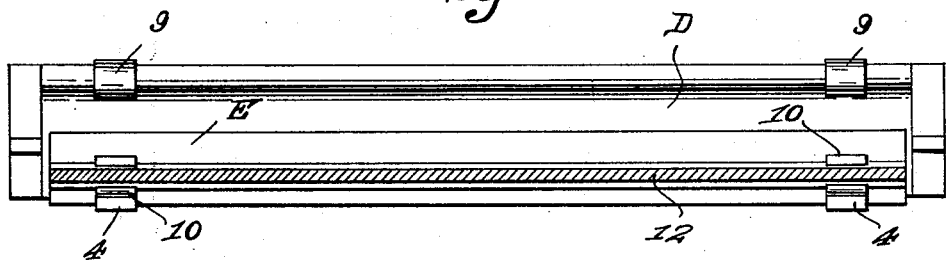
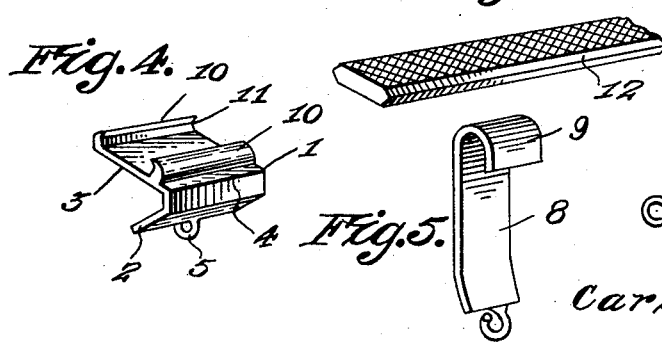
Carl Bailey,
INVENTOR
BY Victor J. Evans & Co.
ATTORNEY Patented Nov. 8, 1932

1,887,394

UNITED STATES PATENT OFFICE

CARL BAILEY, OF INDIANAPOLIS, INDIANA

LAWN MOWER SHARPENER

Application filed August 19, 1931. Serial No. 558,131.

This invention relates to attachments for lawn mowers, and its general object is to provide a sharpener for the knife blades of the mower, and the sharpener is detachably associated with respect to the cutter bar in a manner to be arranged in the path of the knife blades during the rotation of the latter, with the result none of the parts of the mower have to be removed in order to sharpen the knife blades, as when the knife blade carrier is rotated, the blades move across the sharpener, therefore the blades are sharpened expeditiously with very little effort.

A further object of the invention is to provide a sharpener for the knife blades of a lawn mower that is easily attached thereto and removable therefrom, is simple in construction, inexpensive to manufacture and extremely efficient in operation and service.

This invention also consists in certain other features of construction and in the combination and arrangement of the several parts, to be hereinafter fully described, illustrated in the accompanying drawing and specifically pointed out in the appended claim.

In describing my invention in detail, reference will be had to the accompanying drawing wherein like characters denote like or corresponding parts throughout the several views, and in which:

Figure 1 is a transverse sectional view taken through a lawn mower, showing my sharpener applied thereto.

Figure 2 is a front view showing the application of the sharpener to the cutter bar.

Figure 3 is a fragmentary perspective view showing one form of the sharpening element utilized with my sharpener.

Figure 4 is a perspective view showing a part of the clamping means.

Figure 5 is a similar view of a clamping piece.

Figure 6 is a view of the coil spring for holding the parts of the clamp in operative position.

Referring to the drawing in detail, the letter A indicates a lawn mower of the usual type and which includes a knife blade carrier B and the blades are indicated by the letter C, while D indicates the cutter bar which has secured thereto the usual cutting blade E.

My sharpener is detachably associated with the cutter bar and its cutting blade and includes a pair of clamps and one clamp of the pair is disposed adjacent the ends of the cutter bar and its blade as clearly shown in Figure 2.

Each of the clamps include a substantially V-shape in cross section plate 1 provided with a relatively short arm 2 in the form of a flat strip, and a relative long arm 3 which is likewise in the form of a flat strip and disposed between the arms 2 and 3 is a connecting strip 4.

The arm 2 has formed therewith midway its ends and extending from the outer end thereof an eye 5 for the purpose of receiving one of the ends of a coil spring 6, while the opposite end of the coil spring is received in an eye 7 formed with one of the ends of a hook plate 8 that has its opposing end arranged in curved formation to provide a hook 9 which is adapted to be disposed about the upper end of the cutter bar as clearly shown in Figure 1 and thence follows the rear side of the bar and terminates below the same, with the eye 7 of the hook plate 8 disposed in alignment with the eye 5 of the V-shape plate 1, the latter being arranged in fitting engagement with the cutting blade of the cutter bar. By this construction, it will be apparent that the V-shape plate and hook plate are held in clamping engagement with the cutter bar and its cutting blade.

The V-shape plates 1 of the clamps are provided with elongated tongues 10 extending transversely thereof and these tongues have formed therewith V-shape in cross section channel grooves 11 disposed in confronting relation with respect to each other to slidably receive a file or a strip of emery stone such as shown in Figure 3, and it will be noted from this figure that the longitudinal edges of the file or stone which is indicated by the reference numeral 12 are shaped to fit the grooves 11.

From the above description and disclosure of the drawing, it will be noted that the file or emery stone is disposed in the path of the knife blades C so that upon rotation of the knife blade carrier B the blades C will pass across the file or emery stone and therefore be sharpened and when it is desired to sharpen the knife blades, the cutter bar is adjusted to the position as shown in Figure 1, and the clamps together with the file or emery stone are attached thereto. When the sharpening operation has been completed, the clamps with the file or emery stone are removed, then the cutter bar is reset for proper association with respect to the knife blades.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A sharpener for a lawn mower, comprising a pair of clamps, each being substantially V-shape in cross section and having a relatively long arm and a short arm, there being an eye formed on said short arm and tongues on said long arm, a hook plate cooperating with each of said clamps and having an eye formed at one end thereof, the opposite end being curved to provide a hook, a coil spring having its ends received by said eyes for securing said clamps to the stationary blade of the mower, and a sharpening element secured to said tongues and positioned for arrangement in the path of the knife blades of the mower.

In testimony whereof I affix my signature.

CARL BAILEY.